United States Patent
Wilson et al.

(10) Patent No.: US 9,776,898 B2
(45) Date of Patent: Oct. 3, 2017

(54) TREATMENT OF AQUIFER MATRIX BACK DIFFUSION

(71) Applicant: REGENESIS BIOREMEDIATION PRODUCTS, San Clemente, CA (US)

(72) Inventors: Scott B. Wilson, Carlsbad, CA (US); Benjamin V. Mork, Newport Beach, CA (US); Jeremy Birnstingl, Bath (GB); Kristen A. Thoreson, Irvine, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 239 days.

(21) Appl. No.: 14/621,031

(22) Filed: Feb. 12, 2015

(65) Prior Publication Data

US 2015/0232359 A1  Aug. 20, 2015

Related U.S. Application Data

(60) Provisional application No. 61/940,142, filed on Feb. 14, 2014.

(51) Int. Cl.
| | | |
|---|---|---|
| *B01D 15/00* | (2006.01) | |
| *B01J 39/00* | (2006.01) | |
| *C02F 1/42* | (2006.01) | |
| *E02B 15/00* | (2006.01) | |
| *C02F 3/28* | (2006.01) | |
| *C02F 1/28* | (2006.01) | |
| *B09C 1/10* | (2006.01) | |
| *C02F 101/30* | (2006.01) | |
| *C02F 103/06* | (2006.01) | |
| *C02F 3/00* | (2006.01) | |
| *B09C 1/00* | (2006.01) | |

(52) U.S. Cl.
CPC ............. *C02F 3/2806* (2013.01); *B09C 1/10* (2013.01); *C02F 1/283* (2013.01); *B09C 1/002* (2013.01); *B09C 2101/00* (2013.01); *C02F 2003/003* (2013.01); *C02F 2101/30* (2013.01); *C02F 2103/06* (2013.01); *C02F 2303/16* (2013.01); *C02F 2305/06* (2013.01)

(58) Field of Classification Search
CPC ... B09C 1/08; B09C 1/02; C02F 1/283; C02F 2103/06; C02F 3/34; C02F 3/2806
See application file for complete search history.

(56) References Cited

U.S. PATENT DOCUMENTS

| | | | |
|---|---|---|---|
| 5,006,250 A | | 4/1991 | Roberts et al. |
| 5,196,124 A | * | 3/1993 | Connor .................. B09C 1/002 166/270.1 |
| 5,217,616 A | | 6/1993 | Sanyal et al. |
| 5,728,302 A | * | 3/1998 | Connor .................. B09C 1/002 210/679 |
| 6,592,294 B1 | | 7/2003 | Moore |
| 2004/0195182 A1 | | 10/2004 | Elliott |
| 2007/0297858 A1 | | 12/2007 | Imbrie |
| 2014/0232359 A1 | * | 8/2014 | Dash .................... H02M 3/158 323/235 |

FOREIGN PATENT DOCUMENTS

WO           9849106           4/1998

OTHER PUBLICATIONS

Young, Lee W.; International Search Report; PCT/US 15/15899; dated Jan. 15, 2015; 8 pages.

* cited by examiner

*Primary Examiner* — Ana Fortuna
(74) *Attorney, Agent, or Firm* — Stetina Brunda Garred & Brucker

(57) ABSTRACT

Compositions and methods for in situ ground water remediation. The compositions comprise a colloidal biomatrix comprised of sorbent particles, such as zeolites, organoclays and activated carbon, dispersed in aqueous solution that are injectable into the permeable zones of an aquifer to be treated. Once deposited into the permeable zones of the aquifer, the groundwater concentrations of contaminants in those zones are depleted, thus increasing the rate of diffusion of contaminants of the less permeable zones. The compositions and methods of the present invention can be used to treat any organic contaminants and provide rapid remediation of contaminated ground water by adsorption and biodegradation of such contaminants.

8 Claims, No Drawings

TREATMENT OF AQUIFER MATRIX BACK DIFFUSION

CROSS-REFERENCE TO RELATED APPLICATIONS

The present application claims priority to U.S. Provisional Patent Application Ser. No. 61/940,142, entitled TREATMENT OF AQUIFER MATRIX BACK DIFFUSION, filed on Feb. 14, 2014, all of the teachings of which are incorporated herein by reference.

STATEMENT RE: FEDERALLY SPONSORED RESEARCH/DEVELOPMENT

Not Applicable

BACKGROUND

Pollution of subsurface groundwater by man-made toxic and carcinogenic compounds is widespread throughout the world. Sources of these pollutants include solvents used in industrial processes, hydrocarbon fuels and dry cleaning chemicals. Often these pollutants are released into the environment from leaking pipes and underground storage tanks, poor materials handling practices, and catastrophic spills. Upon release, the pollutants in liquid and gaseous form migrate down through unsaturated soils and fractured rock, eventually impacting groundwater.

Groundwater Pollutant Migration

A source of groundwater pollution, left unchecked, will produce a plume of dissolved or phase-separated pollutant molecules that will move through the groundwater system or aquifer. In aquifers composed of heterogeneous materials (e.g. sand and clay layers) the pollutant tends to flow primarily through zones of higher permeability (e.g. sands). As the zones of higher permeability transport elevated pollutant concentrations a diffusion gradient is established driving the pollutant into adjacent zones of lower permeability (e.g. clays). Over time this can result in adjacent lower permeability zones storing significant masses of dissolved pollutants.

Groundwater Remediation and Back-Diffusion

Over the past several decades groundwater remediation techniques have evolved from simple groundwater extraction technologies to in situ treatment techniques involving for example the injection of surfactant flushing agents, oxidizing agents, reducing agents, and amendments to stimulate the in-place biodegradation of pollutants. These techniques have been shown to impact mostly the high permeability zones within the aquifer system.

Thus, while historical remediation approaches remove contaminant concentrations from the more permeable zones, zones of lower permeability are less treated. This sets up a reversal in the contaminant diffusion gradient referred to as "back diffusion", where dissolved contaminant concentrations stored in the lower permeability zones diffuse back into the areas of higher permeability where contaminants have been removed. Back diffusion has been shown to occur over very long periods of time causing persistent low levels of contaminants to impact groundwater wells after attempts at aquifer remediation.

Back Diffusion Stalls Remediation Programs

In a recent report from the National Research Council (NRC, 2012 and references therein), it was estimated that over $200 billion will be spent on cleanup at 300,000 contaminated sites in the U.S. through the year 2033. Some of the key reasons for protracted timeframes and increased costs on these site cleanups are: "difficulties in characterizing the nature and extent of the problem in highly heterogeneous subsurface environments, as well as use of remedial technologies that have not been capable of achieving restoration in many of these geologic settings." In addition, the document goes on to identify back diffusion (also known as matrix back diffusion) as one of the prominent processes that limit our ability to clean up groundwater at complex sites. The NRC report also states that "there are no proven remedial techniques to preferentially target and accelerate the removal of contaminants from localized sites that are desorption/diffusion limited." In light of this report there is clearly a need for techniques that address groundwater contamination associated with matrix back diffusion and thus allow faster and lower-cost cleanup of contaminated sites.

PRIOR ART

Traditional sorbents, the most common of which is granular activated carbon (GAC), have been used extensively in above-ground (ex-situ) treatment systems to remove organic contaminants from water. In addition, biological activated carbon (BAC, or Bio-GAC) has been demonstrated to remove contaminants effectively from water in fluidized-bed water treatment systems. However, none of these systems can be effectively applied to in-situ treatment of groundwater contamination resulting from matrix back diffusion of contaminants. The large particle size (ranging from 40 μm up to about 1 cm) prevents transport of these materials through permeable aquifer zones upon injection. Hydraulic fracturing can be used to increase the distribution of large solid particles, however, it is more costly than low-pressure injection and exhibits less control over the distribution of the injected material. Rather than following the more permeable channels to the interfaces of matrix back diffusion, the fractures propagate randomly through zones of differing permeability.

Powdered or granular activated carbon is sometimes applied in-situ in the form of permeable barriers or trenches. This approach is very costly and only treats the volume of aquifer associated with the trench, and water that flows through it. It is unable to address the local areas of contamination where matrix back diffusion occurs.

There is a need for remediation approaches that address the problem of matrix back diffusion of contaminants at the interfaces of the low permeability and high permeability aquifer zones. A solution to this problem would ideally accelerate the rate of back diffusion and enhance the rate of treatment of contaminants.

BRIEF SUMMARY

Methods and compositions are disclosed for in-situ groundwater remediation whereby a colloidal biomatrix is placed into the permeable zones of an aquifer by any of a variety of techniques known in the art for introducing remediation chemicals into an aquifer subsurface that subsequently deplete contaminants. In this regard, the colloidal biomatrix includes sorbent particles dispersed in an aqueous solution that are operative to delete contaminants in groundwater once introduced thereto. In this regard, such particles transport in a range from at least 5 cm to up to about 5 meters, depending on the type of soil to which the colloidal biomatrix is applied and the volume of such material injected. Advantageously, as the sorbent particles of the invention collect contaminants, the particles are also operative to colonize with bacteria that are able to biodegrade such contaminants.

Advantageously, the methods of the present invention can be utilized to treat any organic contaminants, as well as chlorinated and fluorinated contaminants. The compositions and methods of the present invention further are operative to provide rapid remediation of contaminated groundwater that overcomes the challenges associated with matrix back diffusion processes.

DETAILED DESCRIPTION

The detailed description set forth below is intended as a description of the presently preferred embodiment of the invention, and is not intended to represent the only form in which the present invention may be implemented or performed. The description sets forth the functions and sequences of steps for practicing the invention. It is to be understood, however, that the same or equivalent functions and sequences may be accomplished by different embodiments and that they are also intended to be encompassed within the scope of the invention.

The present invention provides an efficient means of in-situ groundwater remediation which addresses the pervasive issue of residual contamination associated with matrix back diffusion. This method involves the placement of a colloidal biomatrix into the permeable zones of the aquifer by low pressure injection, gravity feed, or other common means of introducing remediation chemicals into the subsurface.

The colloidal biomatrix is comprised of sorbent particles, dispersed in aqueous solution such that they effectively transport through soil and groundwater upon injection. The colloid then deposits on soil after distribution in the subsurface. Transport of these particles should range from at least 5 centimeters up to about 5 meters, depending on the soil type and volume injected.

After deposition in the permeable zones of the aquifer, the groundwater concentrations of contaminants in those zones are depleted, thus increasing the rate of diffusion of contaminants out of the less permeable zones. As the sorbent particles of the invention collect contaminant, they also are colonized with bacteria that are able to biodegrade the contaminants. This invention can be used to enhance the natural biodegradation process (natural attenuation), or the biomatrix can be added along with reagents that enhance biodegradation of contaminants, as mentioned above.

In summary, a biomatrix is defined as a collection of sorbent particles that support bacterial growth and adsorption of contaminants from the groundwater. In the present invention, these particles can be effectively distributed throughout the higher permeability zones of a contaminated aquifer. These features allow the present invention to remediate groundwater at contaminated sites by:

1) transporting colloidal sorbent biomatrix particles through the permeable zones of the aquifer to adsorb the present contamination;

2) depositing colloidal biomatrix particles on soil and residing in the permeable channels of the aquifer, including at the interface of low-permeability zones;

3) providing a matrix for both bacteria and contaminants to reside, thus increasing the efficiency of biodegradation to destroy contaminants;

4) decreasing contaminant concentrations in groundwater at the interface of low-permeability and high-permeability zones, thus increasing the rate of diffusion of contaminants out of the low-permeability zones.

Overall, this approach provides rapid remediation of contaminated groundwater by sorption and biodegradation of contaminants, and overcomes the challenges associated with matrix back diffusion processes.

The colloidal sorbent of this invention can be any material that effectively sorbs contaminants from water, including zeolites, organoclays, and activated carbon. The colloidal sorbent could be prepared from a number of commercially available sorbent materials such as Organoclay®, St. Cloud™ Zeolite, or Darco® activated carbons. The preferred embodiment employs activated carbon as the sorbent material.

The particle size of the colloidal sorbent is 0.1 to 10 microns, preferably 1 to 5 microns.

The groundwater contaminants that are treated by this invention are any organic contaminants that sorb to activated carbon and other sorbents used in water purification. These include all petroleum hydrocarbons, e.g. gasoline, diesel, motor oil and their constituents, chlorinated solvents including trichloroethene, tetrachloroethene, dichloroethenes, vinyl chloride, chlorinated ethanes, chlorinated benzenes, and fluorinated compounds including perfluorooctane sulfonate and perfluorooctanoic acid. These groundwater contaminants are listed for example and are not meant to limit the scope of the invention.

The above description is given by way of example, and not limitation. Given the above disclosure, one skilled in the art could devise variations that are within the scope and spirit of the invention disclosed herein, including various ways of remediating contaminated groundwater in a manner that addresses residual contamination associated with matrix back diffusion. Further, the various features of the embodiments disclosed herein can be used alone, or in varying combinations with each other and are not intended to be limited to the specific combination described herein. Thus, the scope of the claims is not to be limited by the illustrated embodiments. Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A method of biodegrading organic pollutants diffusing out from low permeability zones in an aquifer system, said method comprising the steps of:
    a) identifying a high permeability zone of said aquifer system having an interface with a low permeability zone and depositing a colloidal sorbent biomatrix into said high permeability zone at a point of application, said colloidal sorbent biomatrix comprising sorbent particles of activated carbon having a particle size ranging from 0.1 to 10 microns;
    b) transporting and depositing sorbent particles of said colloidal sorbent biomatrix a distance from 5 centimeters to 5 meters through said high permeability zone from the point of application;
    c) depositing sorbent particles of said colloidal sorbent biomatrix upon the interface of the high permeability zone with the low permeability zone;

d) sorbing organic pollutants located in said high permeability zone on the surface of the sorbent particles deposited through said high permeability zone in step b); and e) sorbing organic pollutants diffusing from the low permeability zone on the surface of the sorbent particles deposited upon the interface of the higher permeability zone with the low permeability zone in step c).

2. The method of claim 1, further comprising a step of applying a fermentable substrate to the aquifer system so as to stimulate microbes colonizing the sorbent biomatrix for anaerobically biodegrading organic pollutants, said substrates being selected from the group consisting of: carbohydrates, organic acids, vegetable oils, alcohols, and proteins.

3. The method of claim 2, further comprising a step of applying a cultured strain or population of microbes to the aquifer system.

4. The method of claim 1, further comprising a step of applying an electron accepting substrate to the aquifer system so as to aid in the oxidative biodegradation of organic pollutants by microbes colonizing the sorbent biomatrix, said electron accepting substrate being selected from the group consisting of: oxygen, nitrate, and sulfate.

5. The method of claim 4, further comprising a step of applying a cultured strain or population of microbes to the aquifer system.

6. The method of claim 1, wherein said colloidal sorbent biomatrix comprises sorbent particles of activated carbon having a particle size ranging 1 to 5 microns.

7. The method of claim 1, wherein the colloidal sorbent biomatrix is configured to be colonized with indigenous microbes for biodegrading the organic pollutants sorbed in steps d) and e).

8. The method of claim 1, wherein the organic pollutants are selected from the group consisting of: hydrocarbons, organochlorides, organobromides, organosulfides, organoiodides, and organofluorides.

* * * * *